(12) United States Patent
Hironimus et al.

(10) Patent No.: US 7,500,341 B2
(45) Date of Patent: Mar. 10, 2009

(54) AGRICULTURAL CUTTER COMPRISING A CARRIER VEHICLE AND SEVERAL WORK UNITS

(75) Inventors: Jeannot Hironimus, Schwebwiller (FR); Horst Neuerburg, Saverne (FR); Olivier Stutzmann, Zilling (FR); David Bonnin, Delft (NL)

(73) Assignee: Kuhn S.A., Saverne (FR)

( * ) Notice: Subject to any disclaimer, the term of this patent is extended or adjusted under 35 U.S.C. 154(b) by 94 days.

(21) Appl. No.: 10/506,675

(22) PCT Filed: Mar. 13, 2003

(86) PCT No.: PCT/FR03/00801

§ 371 (c)(1),
(2), (4) Date: Sep. 17, 2004

(87) PCT Pub. No.: WO03/079761

PCT Pub. Date: Oct. 2, 2003

(65) Prior Publication Data

US 2005/0252183 A1 Nov. 17, 2005

(30) Foreign Application Priority Data

Mar. 21, 2002 (FR) .................................. 02 03893

(51) Int. Cl.
*A01D 75/30* (2006.01)
(52) U.S. Cl. .......................................................... 56/6
(58) Field of Classification Search ............... 56/6, 56/7, 11.9, 13.5, 13.6, 16.2, DIG. 22, 15.8, 56/202, 249, 10.3, 10.6; 172/456; 280/494
See application file for complete search history.

(56) References Cited

U.S. PATENT DOCUMENTS

| 3,177,638 | A | * | 4/1965 | Johnson ............................ 56/7 |
| 3,429,109 | A | * | 2/1969 | Heth et al. ........................ 56/7 |
| 3,563,001 | A | | 2/1971 | Bourassa et al. |
| 3,563,011 | A | * | 2/1971 | Bramley et al. .................. 56/7 |
| 3,608,284 | A | | 9/1971 | Erdman |

(Continued)

FOREIGN PATENT DOCUMENTS

CA        1 248 763       1/1989

(Continued)

OTHER PUBLICATIONS

U.S. Appl. No. 10/506,675, filed Sep. 17, 2004, Hironimus, et al.

(Continued)

*Primary Examiner*—Árpád Fábián-Kovács
(74) *Attorney, Agent, or Firm*—Oblon, Spivak, McClelland, Maier & Neustadt, P.C.

(57) ABSTRACT

An agricultural machine including a carrying vehicle and plural work units configured to cut a standing product. The agricultural machine includes at least two front work units arranged, during work and viewed in a direction of forward travel of the carrying vehicle, at the front of the carrying vehicle, and at least two lateral work units arranged, during work, on either side of a work area of the front work units. The front work units and the lateral work units can advantageously be moved with respect to the carrying vehicle to occupy a transport position or a work position.

12 Claims, 12 Drawing Sheets

U.S. PATENT DOCUMENTS

Figure 1:
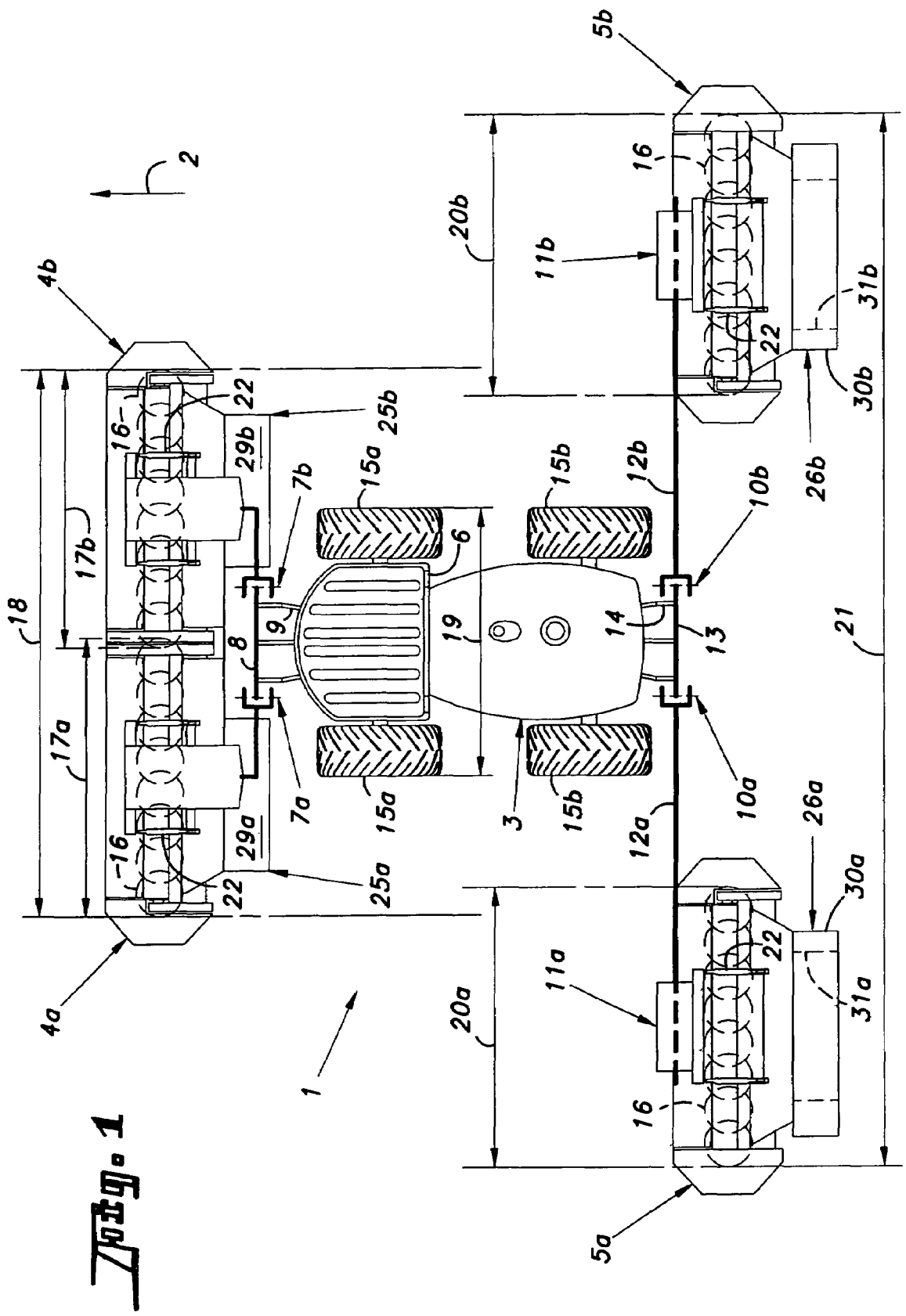

| Patent No. | | Date | Inventor | Class |
|---|---|---|---|---|
| 3,717,981 | A * | 2/1973 | van der Lely | 56/6 |
| 4,370,846 | A * | 2/1983 | Arnold | 56/6 |
| 4,769,976 | A * | 9/1988 | Bassett et al. | 56/7 |
| 4,777,786 | A * | 10/1988 | Arnold | 56/199 |
| 4,926,621 | A * | 5/1990 | Torras | 56/6 |
| 5,069,022 | A * | 12/1991 | Vandermark | 56/6 |
| 5,133,174 | A * | 7/1992 | Parsons, Jr. | 56/6 |
| 5,280,695 | A * | 1/1994 | Nunes et al. | 56/6 |
| 5,297,378 | A * | 3/1994 | Smith | 56/7 |
| 5,343,680 | A * | 9/1994 | Reichen et al. | 56/249 |
| 5,794,422 | A * | 8/1998 | Reimers et al. | 56/11.9 |
| 5,813,202 | A * | 9/1998 | Goman et al. | 56/15.2 |
| 6,047,530 | A * | 4/2000 | Bednar | 56/6 |
| 6,082,084 | A  | 7/2000 | Reimers et al. | 56/11.9 |
| 6,336,311 | B1* | 1/2002 | Bednar | 56/6 |
| 6,336,312 | B1* | 1/2002 | Bednar et al. | 56/6 |
| 6,508,050 | B1* | 1/2003 | Krone et al. | 56/192 |
| 6,530,198 | B2* | 3/2003 | Bergsten et al. | 56/10.4 |
| 6,758,031 | B2* | 7/2004 | Franet et al. | 56/14.9 |
| 6,857,253 | B2* | 2/2005 | Reimers et al. | 56/10.6 |
| 6,938,399 | B2* | 9/2005 | Guiet | 56/6 |
| 2001/0003239 | A1 | 6/2001 | Franet | |
| 2002/0170723 | A1* | 11/2002 | Krone et al. | 172/452 |
| 2002/0174634 | A1* | 11/2002 | Franet et al. | 56/7 |
| 2003/0024228 | A1* | 2/2003 | Franet | 56/192 |
| 2005/0252183 | A1 | 11/2005 | Hironimus et al. | |

FOREIGN PATENT DOCUMENTS

| | | |
|---|---|---|
| DE | 44 05 858 | 6/1995 |
| DE | 199 31 684 | 9/2000 |
| DE | 199 32 285 | 4/2001 |
| EP | 0 808 556 | 11/1997 |
| EP | 1 040 751 | 10/2000 |
| EP | 1 093 707 | 4/2001 |
| EP | 1405556 A2 * | 4/2004 |
| FR | 2 792 163 | 10/2000 |

OTHER PUBLICATIONS

U.S. Appl. No. 11/229,711, filed Sep. 20, 2005, Stutzmann.
U.S. Appl. No. 11/341,454, filed Jan. 30, 2006, Hironimus.

* cited by examiner

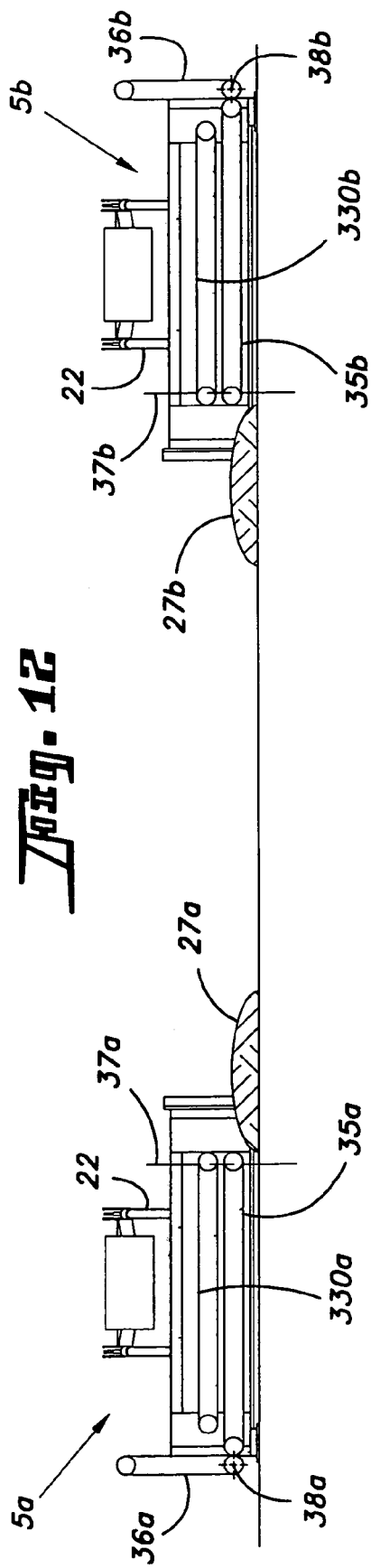
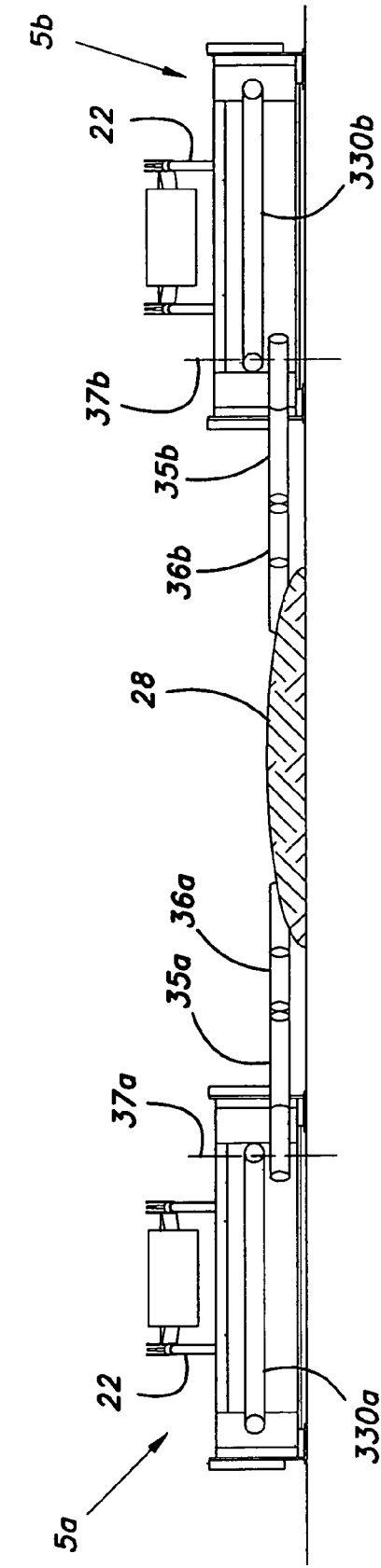

AGRICULTURAL CUTTER COMPRISING A CARRIER VEHICLE AND SEVERAL WORK UNITS

The present invention relates to an agricultural machine comprising a carrying vehicle and several work units which are intended to cut a standing product, said work units being connected to said carrying vehicle.

In the prior art there exists a self-propelled mower comprising a carrying vehicle and three work units. Said carrying vehicle is intended to support and to drive said work units. To do this, said carrying vehicle comprises, in particular, a chassis, an engine and a driver's cab. Said work units are, for their part, intended to cut a standing product such as grass, for example. This known self-propelled mower more specifically comprises a front work unit and two lateral work units. Viewed in a direction of forward travel, the front work unit is arranged at the front of said carrying vehicle. The lateral work units are arranged behind the front work unit, on either side of the area worked by the latter. Thus, this known self-propelled mower has a working width which may reach 9 meters. In the transport position, the front work unit is moved away from the ground by a substantially vertical translational movement. Said lateral work units are, for their part, brought close to a vertical mid-plane of said carrying vehicle by a pivoting movement. As a result, this known self-propelled mower can pass from a width of about 9 meters for work to a width of about 3 meters for transport. Such a reduction in width is necessary to allow the mower to travel on the public highway.

It is an object of the present invention to obtain an agricultural machine which makes possible an increased working width while at the same time complying, when in the transport position, with the legislation regulating travel on the public highway.

To this end, the agricultural machine according to the present invention is characterized in that it comprises:
at least two front work units arranged, during work and viewed in a direction of forward travel, at the front of said carrying vehicle, and
at least two lateral work units arranged, during work, on either side of a work area of said front work units, said front work units and said lateral work units being able to be moved with respect to said carrying vehicle in order to occupy a transport position or a work position.

Figure 2:
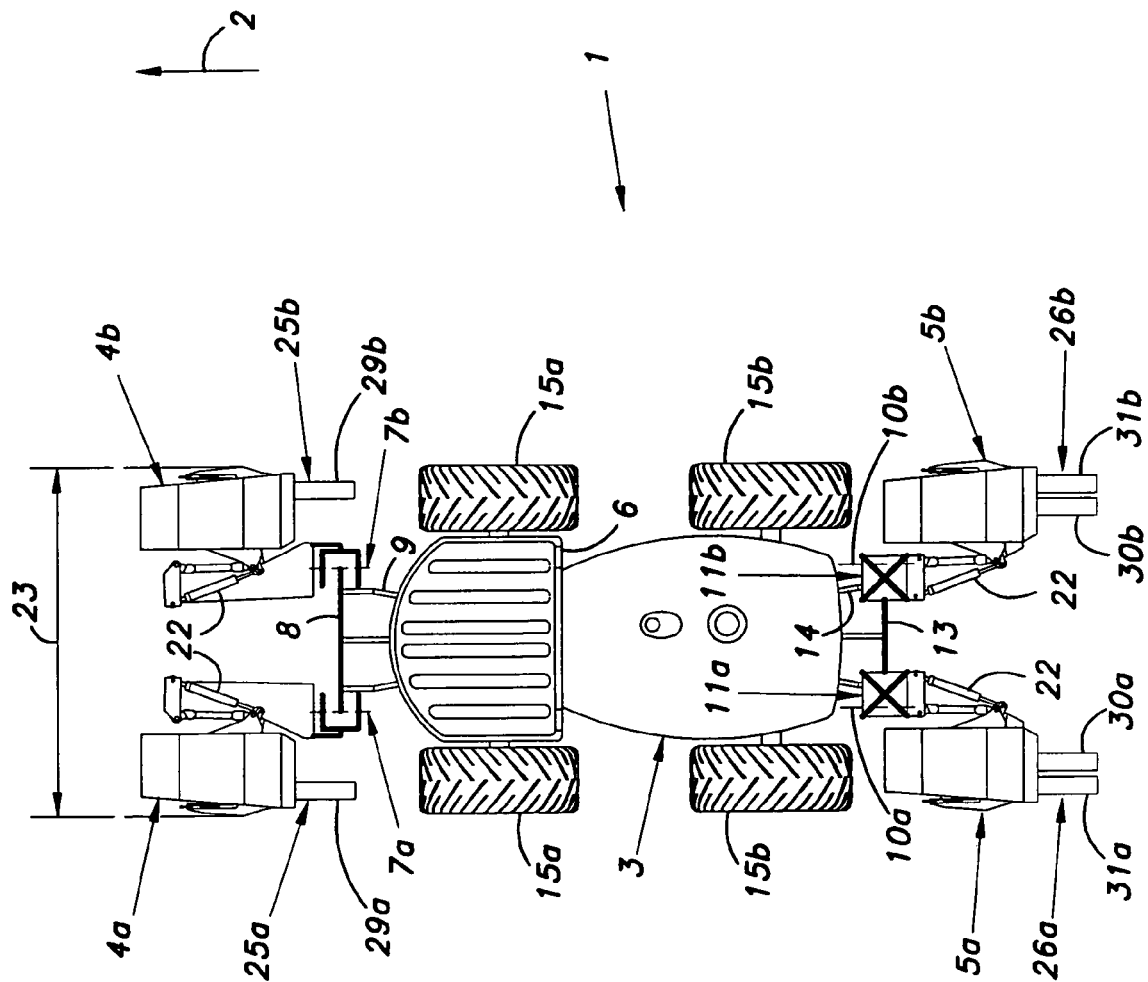
Figure 3:
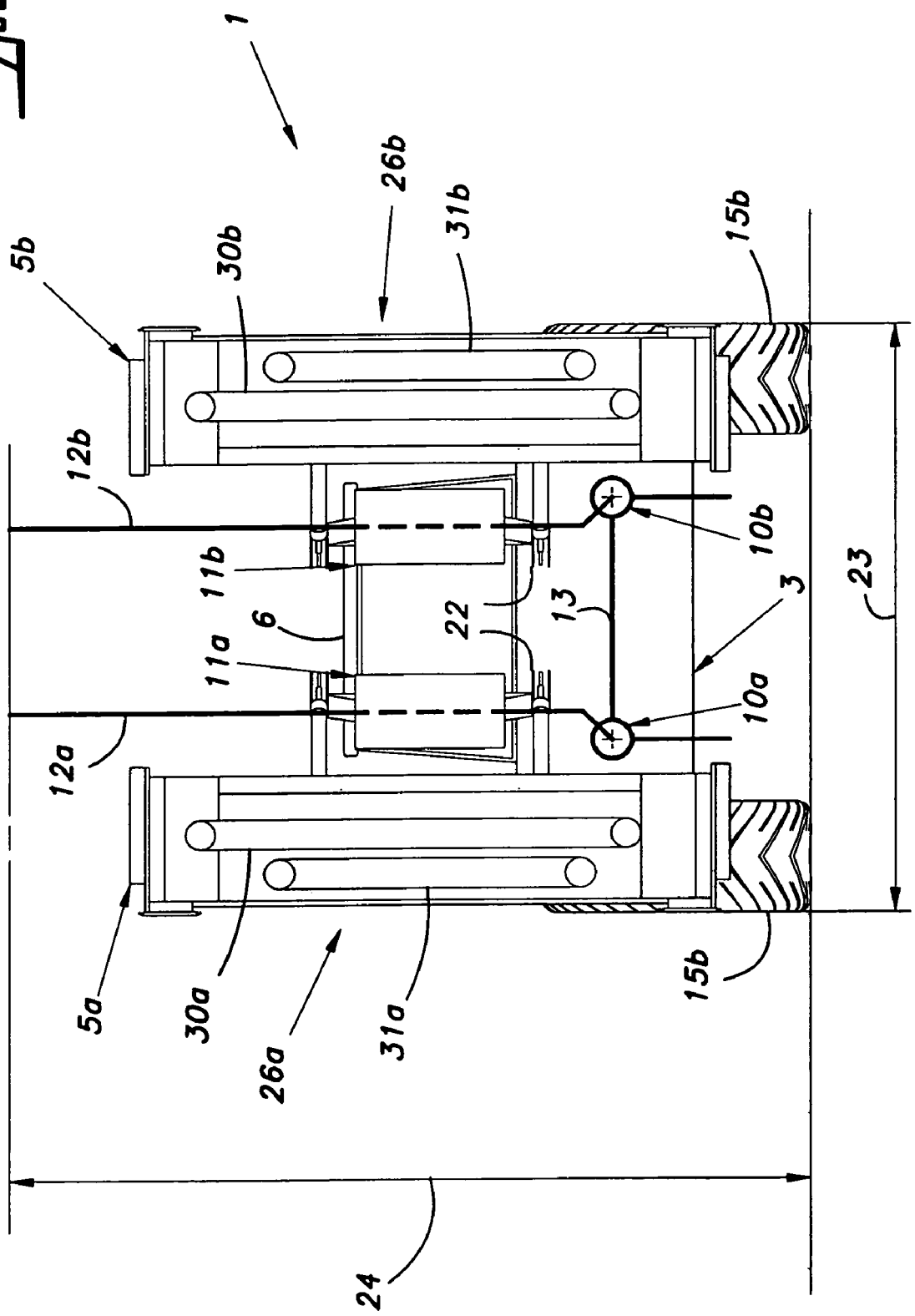
Figure 4:
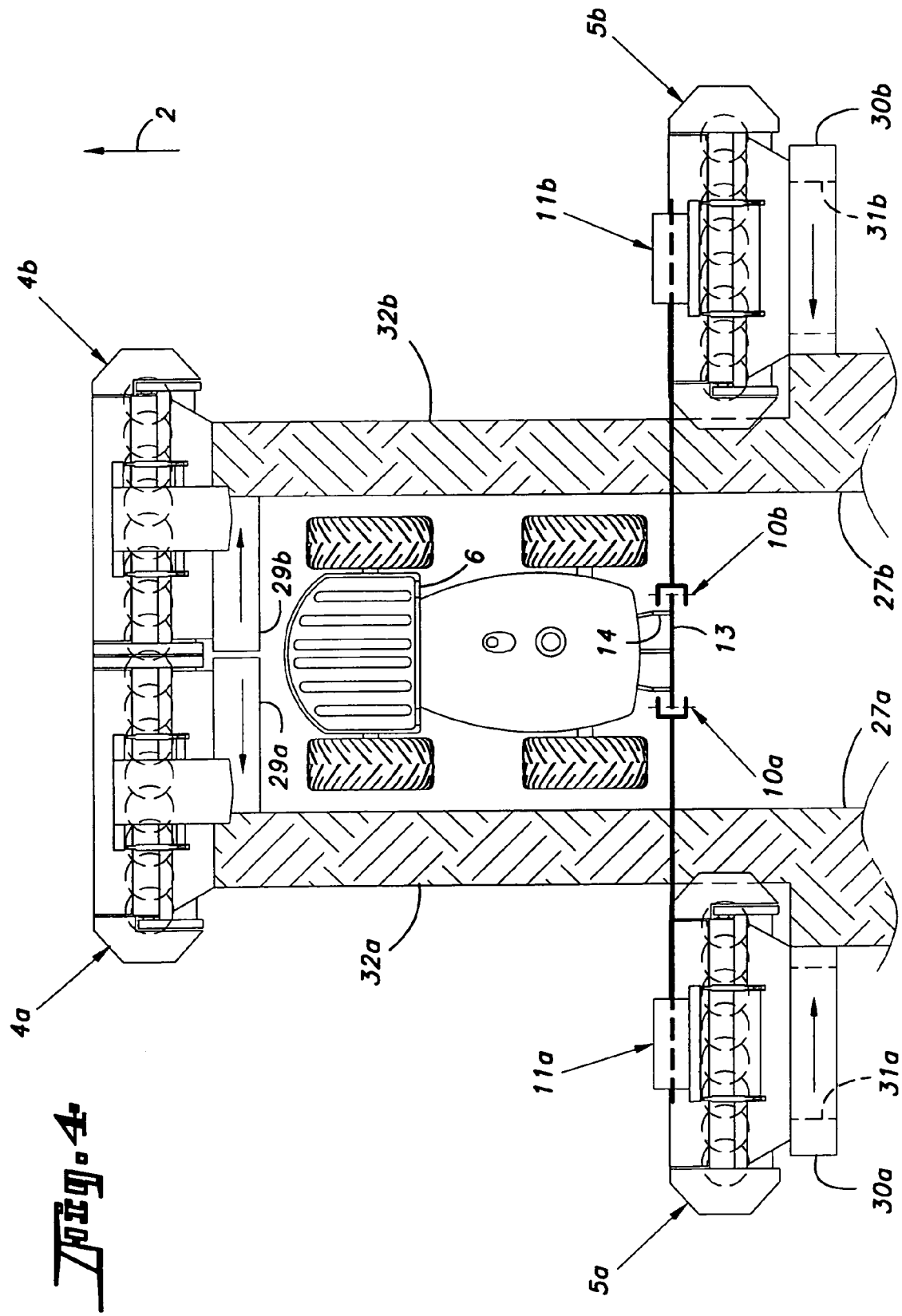
Figure 5:
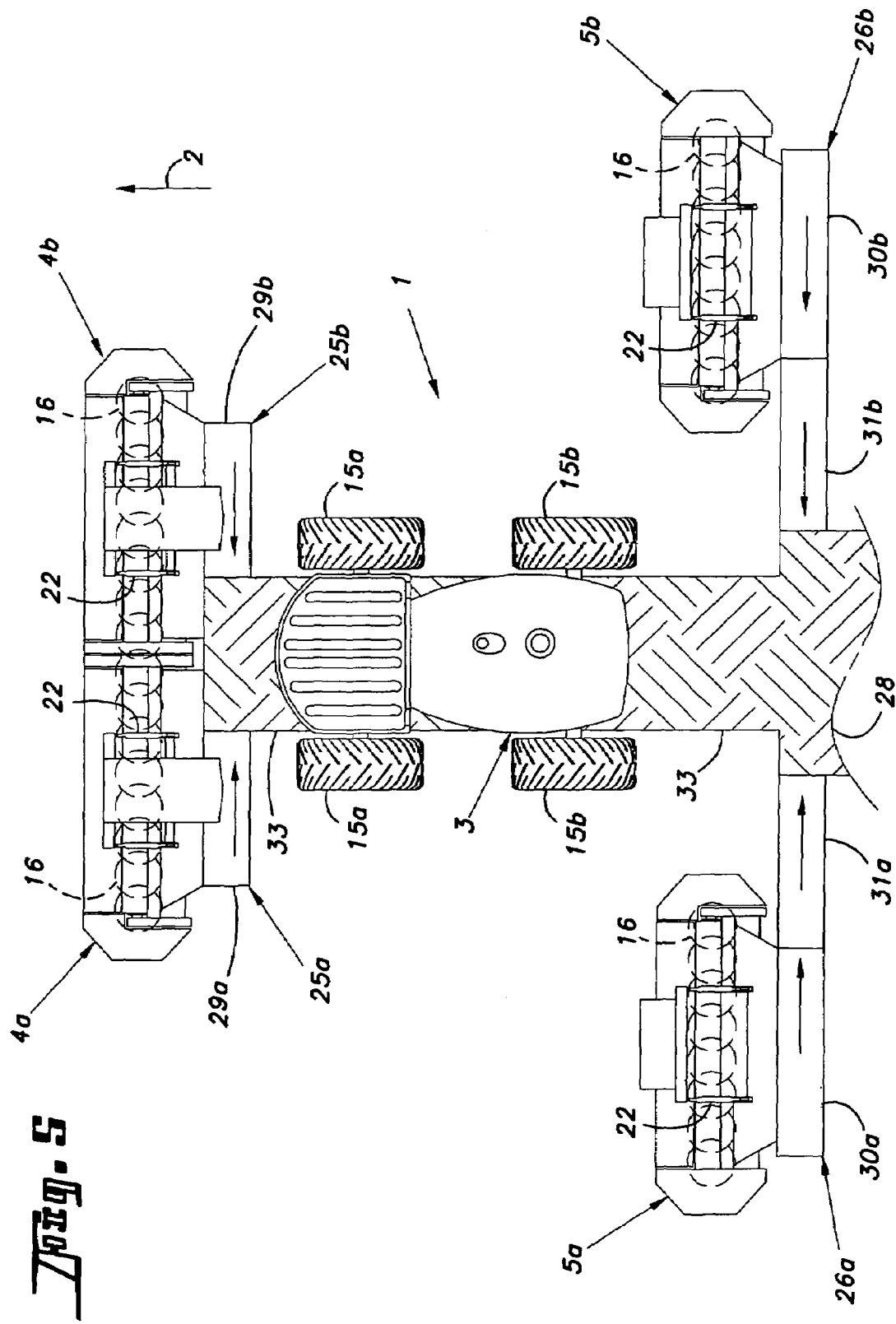
Figure 6:
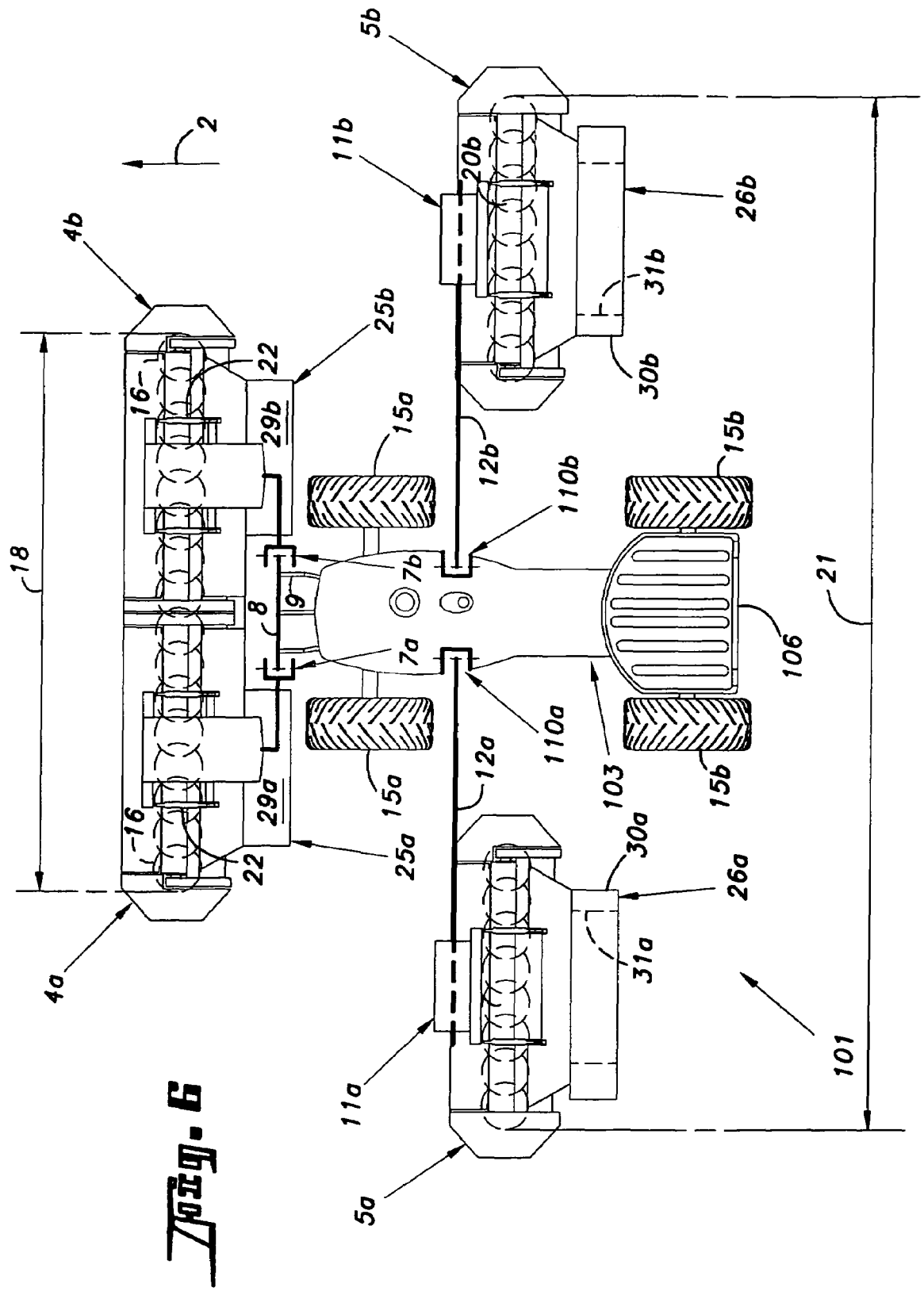
Figure 7:
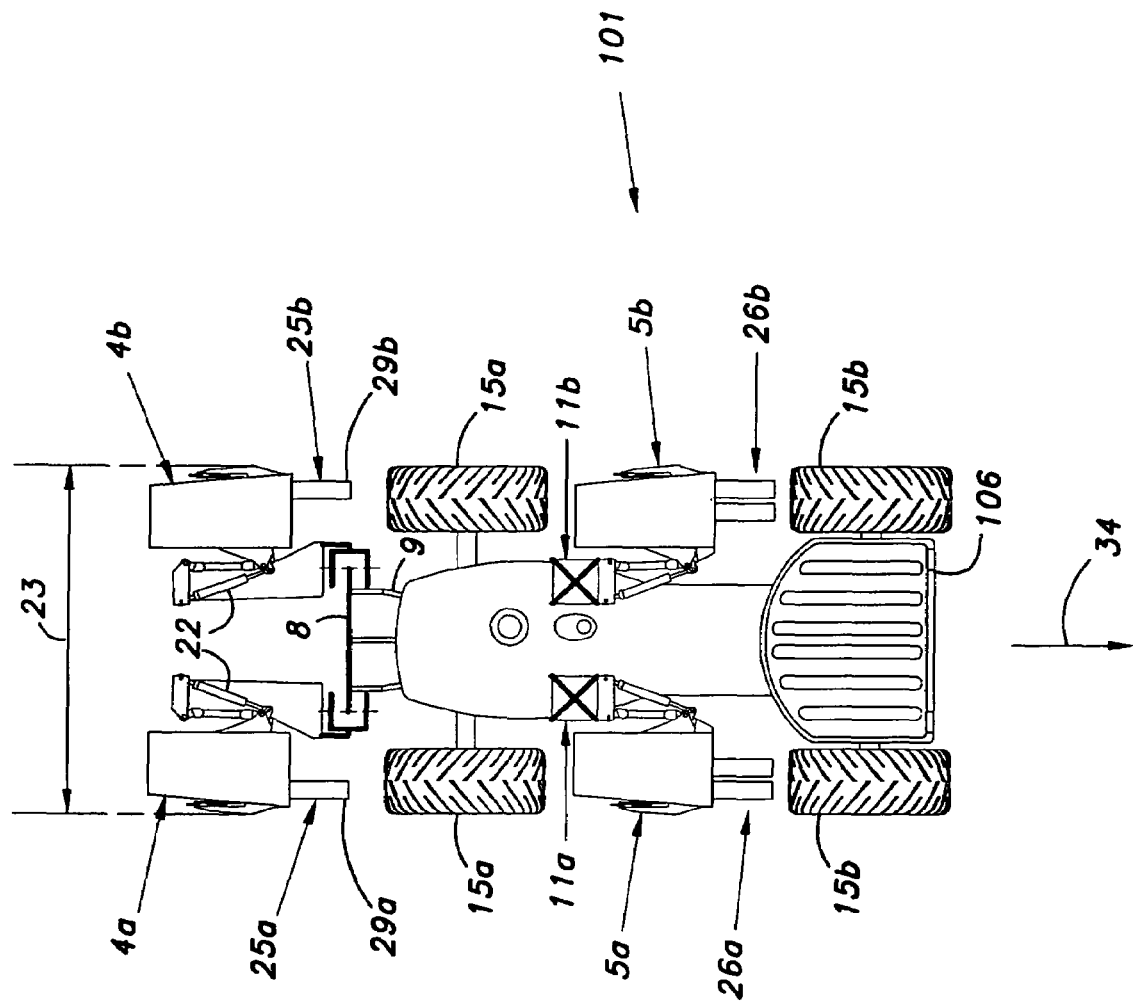
Figure 8:
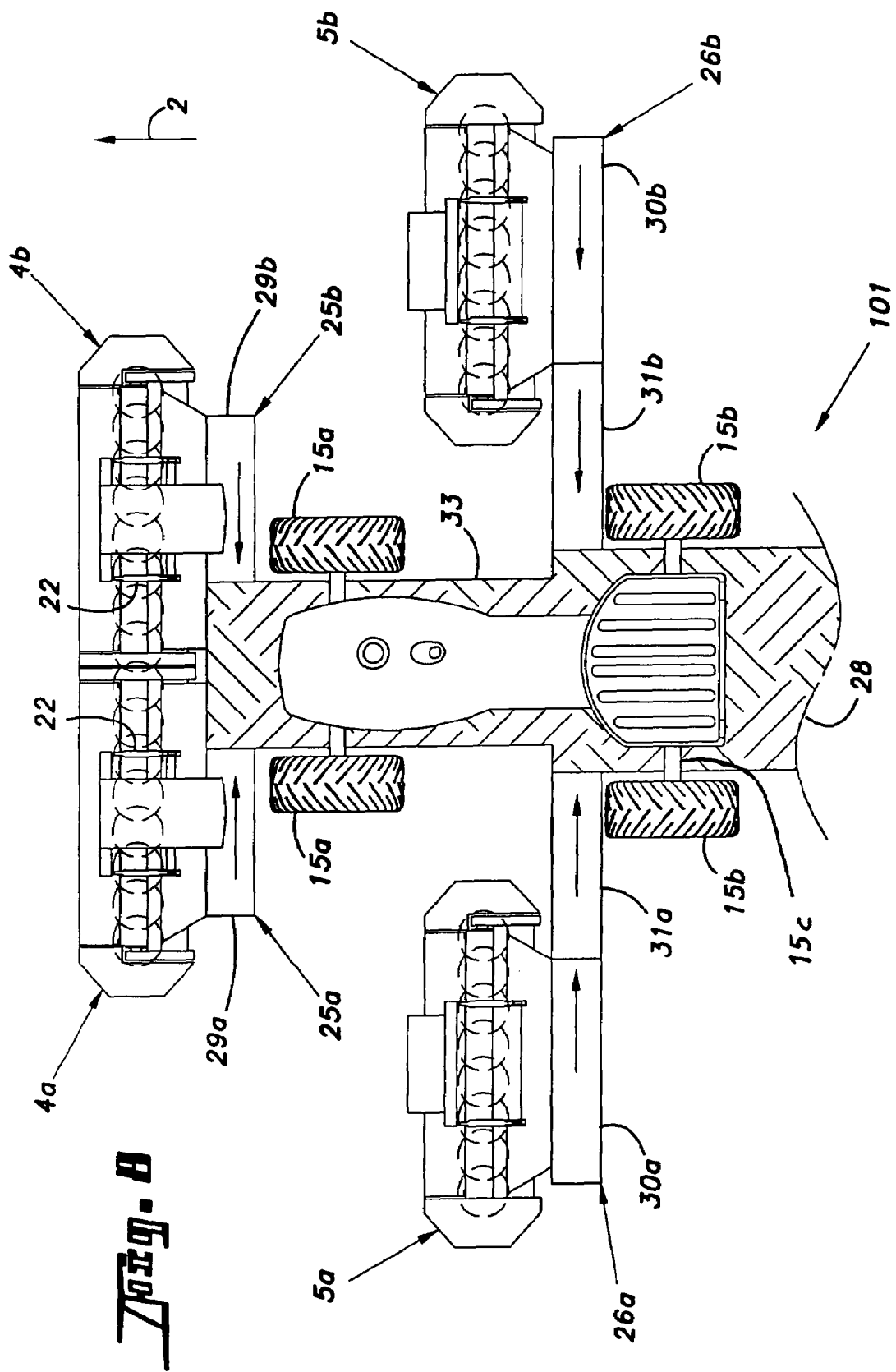
Figure 9:
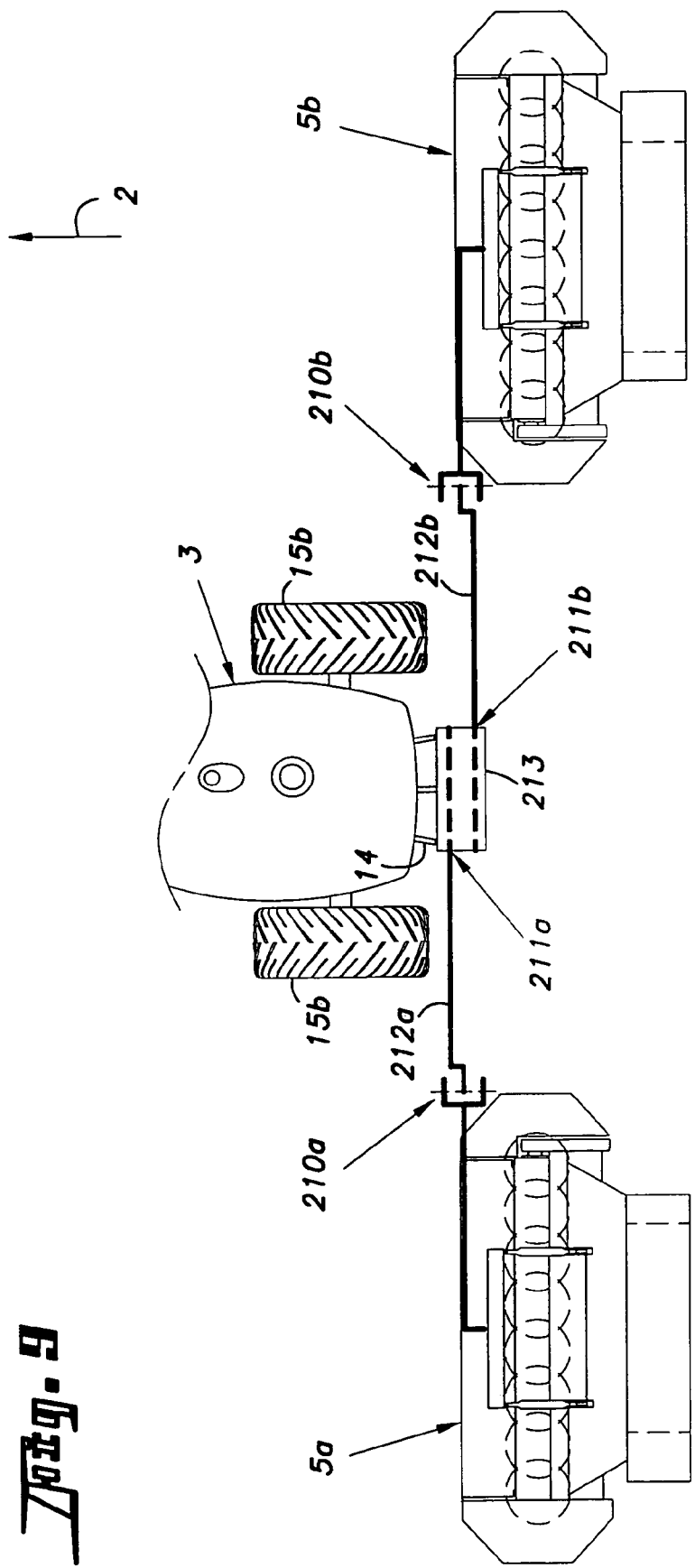
Figure 10:
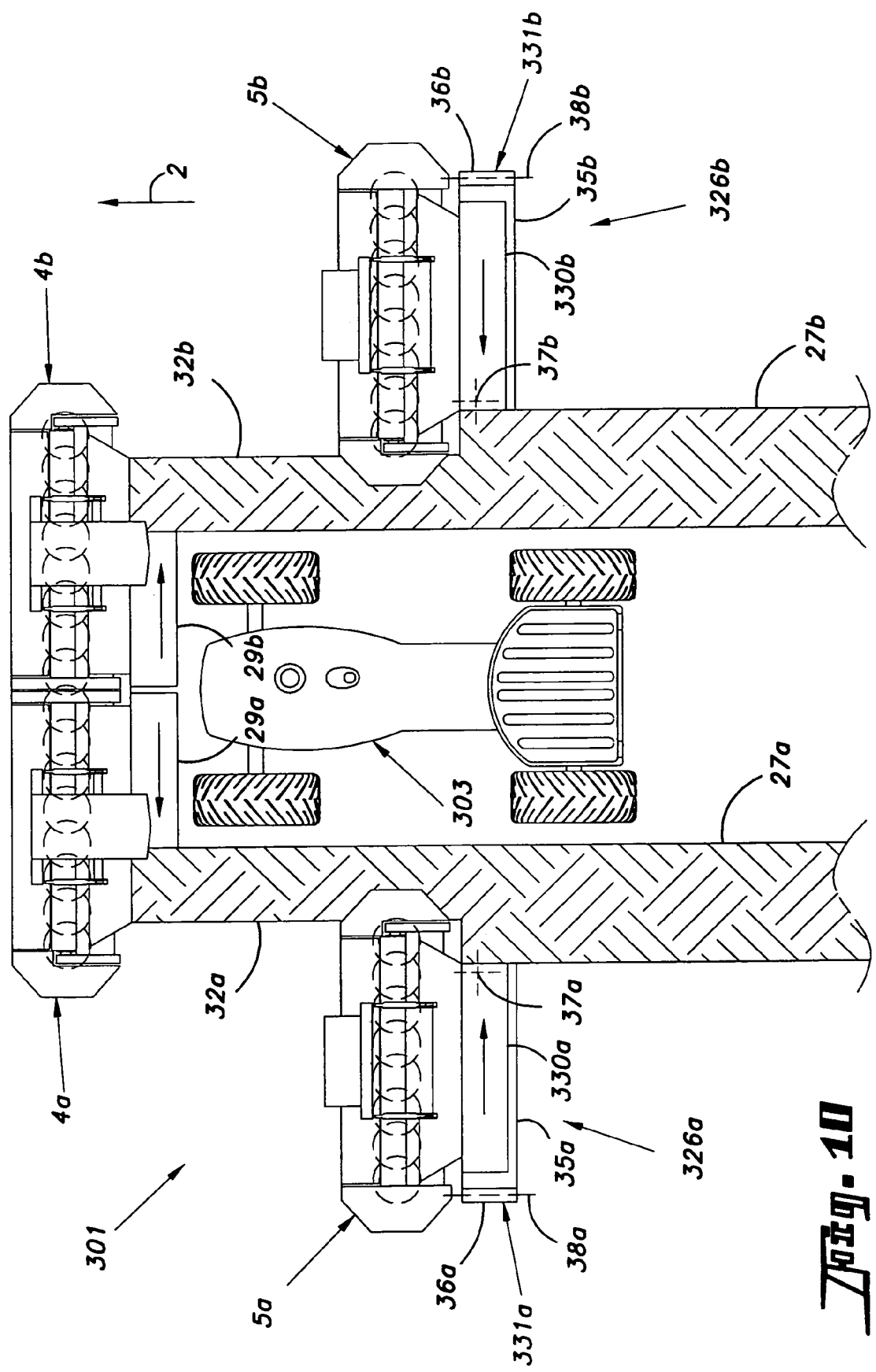
Figure 11:
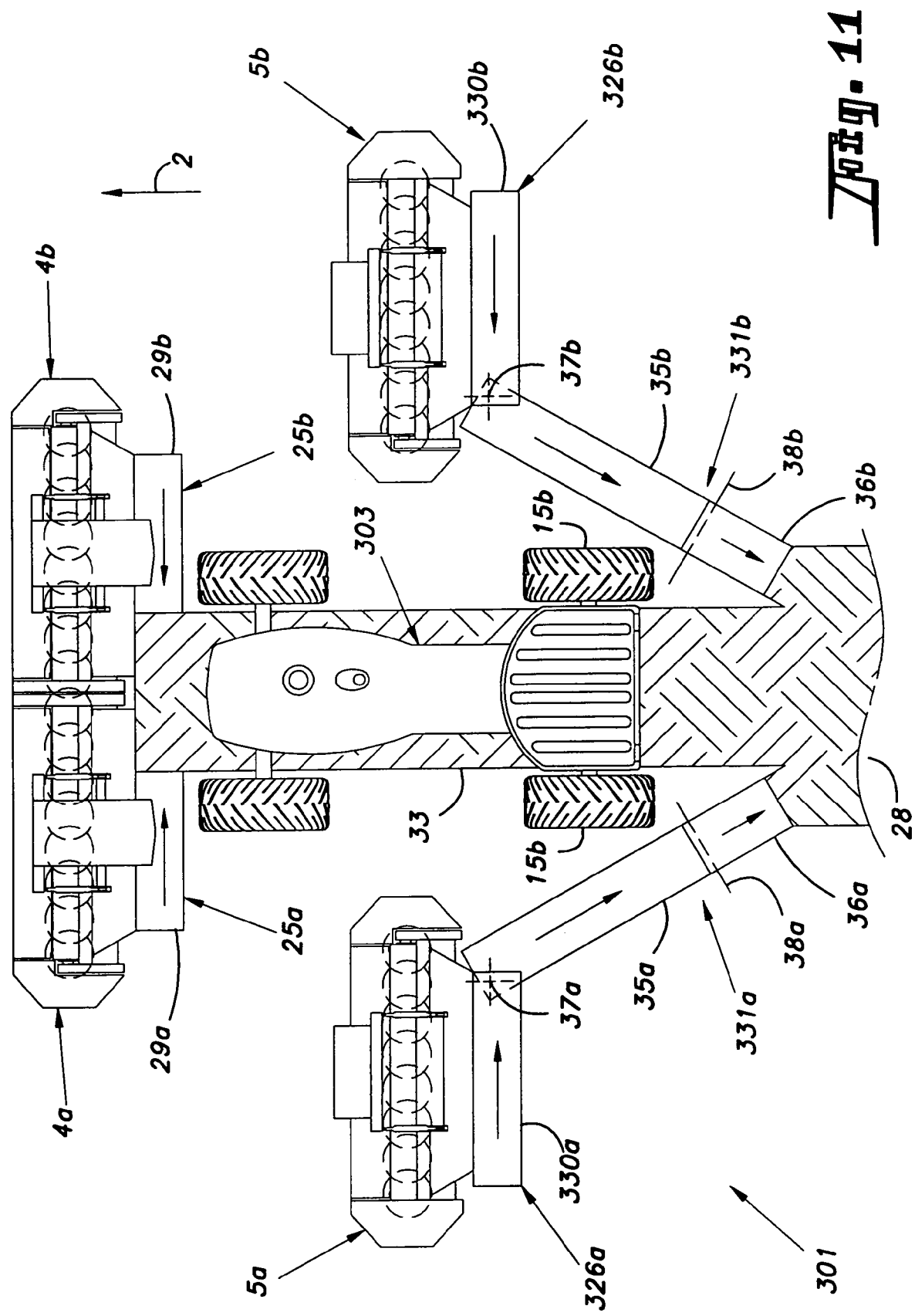

Other features of the invention, to be considered separately or in all their possible combinations, will become apparent in the following description of several nonlimiting exemplary embodiments of the invention which are represented in the appended drawings, in which:

FIG. 1 represents, in a top view and in the work position, a first exemplary embodiment of an agricultural machine according to the present invention, FIG. 2 represents, likewise in a top view, the first exemplary embodiment of FIG. 1 in the transport position, FIG. 3 represents, viewed from behind and on a different scale, the first exemplary embodiment of FIG. 1 in the transport position, FIG. 4 represents, in a top view, the first exemplary embodiment of FIG. 1 in a first work configuration, FIG. 5 represents, in a top view, the first exemplary embodiment of FIG. 1 in a second work configuration, FIG. 6 represents, in a top view and in the work position, a second exemplary embodiment of an agricultural machine according to the present invention, FIG. 7 represents, in a top view, the second exemplary embodiment of FIG. 6 in the transport position, FIG. 8 represents, in a top view, the second exemplary embodiment of FIG. 6 in a work configuration, FIG. 9 represents a partial view of a third exemplary embodiment of an agricultural machine according to the present invention in the work position, FIG. 10 represents, in a top view, a fourth exemplary embodiment according to the present invention in a first work configuration, FIG. 11 represents, in a top view, the fourth exemplary embodiment of FIG. 10 in a second work configuration, FIG. 12 represents a partial view, from behind and on a different scale, of the fourth exemplary embodiment in the first work configuration, FIG. 13 represents a partial view, from behind and on a different scale, of the fourth exemplary embodiment in the second work configuration.

FIG. 1 represents, in a top view, an agricultural machine (1) moving in a direction of forward travel indicated by the arrow (2). In the remainder of the description, the following ideas of "front" and "rear", "in front of" and "behind" are defined with respect to the direction of forward travel (2) and the ideas of "right" and "left" are defined when viewing said agricultural machine (1) from the rear in the direction of forward travel (2).

Said agricultural machine (1) comprises a carrying vehicle (3) and work units (4, 5). Said work units (4, 5) are intended to cut a standing product such as grass, for example. For its part, said carrying vehicle (3) is intended to drive and to at least partially support said work units (4, 5).

Thus, in a manner known to a person skilled in the art, said carrying vehicle (3) comprises a chassis which rests on the ground by means of four wheels (15*a*, 15*b*). Said four wheels (15*a*, 15*b*) are advantageously steering wheels in order to give said agricultural machine (1) a remarkable degree of maneuverability. An engine and a transmission allowing said carrying vehicle (3) to be autonomous are also provided. Preferably, said transmission makes said four wheels (15*a*, 15*b*) driving wheels. Likewise preferably, said engine is additionally capable of driving said work units (4, 5). The transmission of power from said engine to said work units (4, 5) takes place by means of mechanical and/or hydraulic transmission elements known to a person skilled in the art. Said carrying vehicle (3) comprises a driver's cab (6) which allows a driver to take control of the whole of said agricultural machine (1).

Each work unit (4, 5) comprises, for its part, a cutting device resting at least partially on the ground during work. In a manner known to a person skilled in the art, said cutting device is composed of a multitude of cutting members which are driven in rotation about a respective upwardly directed axis. The path described by said cutting members during rotation has been represented by circles in the form of dashed lines (16). Such a cutting device is known to a person skilled in the art and will therefore not be described further.

According to the present invention, said agricultural machine (1) advantageously comprises:
at least two front work units (4*a*, 4*b*) arranged, during work and viewed in said direction of forward travel (2), at the front of said carrying vehicle (3), and
at least two lateral work units (5*a*, 5*b*) arranged, during work, on either side of a work area (18) of said front work units (4*a*, 4*b*).

Furthermore, said front work units (4*a*, 4*b*) and said lateral work units (5*a*, 5*b*) are advantageously able to be moved with respect to said carrying vehicle (3) so as to occupy a transport position or a work position.

In the first exemplary embodiment represented in FIGS. 1 to 5, said agricultural machine (1) comprises two front work units (4a, 4b) and two lateral work units (5a, 5b).

In the work position as represented in FIGS. 1, 4 and 5, said front work units (4a, 4b) are arranged transversely to said direction of forward travel (2) and preferably in the continuation of one another. Advantageously, said front work units (4a, 4b) are arranged so that their respective work areas (17a, 17b) slightly overlap one another. Consequently, the standing product will be cut perfectly over the entirety of the work area (18) covered by said front work units (4a, 4b). In the work position, said front work units (4a, 4b) are preferably arranged symmetrically with respect to a vertical mid-plane of said carrying vehicle (3). In the light of FIG. 1, and likewise advantageously, the width of said work area (18) is greater than the width (19) of said carrying vehicle (3) on the ground. Thus, during work, said carrying vehicle (3) does not crush the standing product.

In the work position as represented in FIGS. 1, 4 and 5, said lateral work units (5a, 5b) are likewise arranged transversely to said direction of forward travel (2) and advantageously in the continuation of one another. Preferably, said lateral work units (5a, 5b) are additionally arranged so that their respective work areas (20a, 20b) slightly overlap said work area (18). In the work position and viewed in said direction of forward travel (2), said lateral work units (5a, 5b) are preferably arranged backwards with regard to said front work units (4a, 4b). Consequently, in the first exemplary embodiment represented in FIGS. 1 to 5, said lateral work units (5a, 5b) are arranged backwards with regard to said carrying vehicle (3). Good distribution of the masses of said agricultural machine (1) on the various wheels (15a, 15b) of said carrying vehicle (3) is thus obtained.

In the work position and in light of FIG. 1, said work units (4a, 4b, 5a, 5b) arranged in this way allow said agricultural machine (1) to have a relatively wide total work area (21). By way of nonlimiting example, with work units (4a, 4b, 5a, 5b) each having a working width of 3 meters, and taking into account the overlapping of said respective work areas (17a, 17b, 20a, 20b), said agricultural machine (1) has a total working width of close to 11.5 meters.

In the transport position and in the light of FIGS. 2 and 3, said work units (4a, 4b, 5a, 5b) are moved in such a way that said agricultural machine (1) complies with the legislation regulating travel on the public highway. Currently in France, this legislation particularly restricts the width (23) of said agricultural machine (1) to 3 meters and the height (24) of said agricultural machine (1) to 4 meters.

To this end, in the first exemplary embodiment represented in FIGS. 1 to 5, each front work unit (4a, 4b) is connected in a pivoting manner to said carrying vehicle (3) by means of a respective articulation (7a, 7b) whose axis is directed in said direction of forward travel (2). Also provided are operating members, for example jacks, intended to pivot said front work units (4a, 4b) about said respective articulation (7a, 7b) from a substantially horizontal work position to a substantially vertical transport position, and vice versa. In the transport position, said front work units (4a, 4b) are preferably arranged symmetrically with respect to said vertical mid-plane of said carrying vehicle (3). In the light of FIG. 2, said respective articulations (7a, 7b) are positioned so that, in the transport position, said front work units (4a, 4b) do not exceed the permitted width (23) for traveling on the public highway. It may be noted that said carrying vehicle (3) itself complies with said permitted width (23).

Said front work units (4a, 4b) are preferably connected by means of said respective articulations (7a, 7b) to a hitching structure (8), which hitching structure (8) is in turn connected to a front hitching device (9) of said carrying vehicle (3). Said front hitching device (9), represented by way of nonlimiting example in the form of a "3-point" hitching device, advantageously makes it possible to move said hitching structure (8), and consequently said front work units (4a, 4b), in a substantially vertical direction. Thus, when passing from the horizontal work position to the substantially vertical transport position, said hitching device (9) makes it possible, if necessary, to facilitate the maneuver by moving said front work units (4a, 4b) away from the ground. Once said substantially vertical transport position has been reached, said hitching device (9) makes it possible, if necessary, to somewhat reduce the height (24) of said agricultural machine (1) by lowering said hitching structure (8).

In the first exemplary embodiment represented in FIGS. 1 to 5, each lateral work unit (5a, 5b) is connected in a pivoting manner to said carrying vehicle (3) by means of a respective articulation (10a, 10b) whose axis is directed in said direction of forward travel (2). Also provided are operating members intended to pivot said lateral work units (5a, 5b) from a horizontal work position to a substantially vertical transport position, and vice versa. In the transport position, said lateral work units (5a, 5b) are preferably arranged symmetrically with respect to said vertical mid-plane of said carrying vehicle (3). In the light of FIG. 3, said respective articulations (10a, 10b) are positioned so that, in the transport position, said lateral work units (5a, 5b) do not exceed the permitted width (23) for traveling on the public highway.

In the first exemplary embodiment, and particularly advantageously, each lateral work unit (5a, 5b) is additionally connected in a sliding manner to said carrying vehicle (3) by means of a respective articulation (11a, 11b) whose axis is directed transversely to said direction of forward travel (2). Also provided are operating members intended to translationally move said lateral work units (5a, 5b) in accordance with said respective articulations (11a, 11b). Each lateral work unit (5a, 5b) can thus be brought close to or moved away from said carrying vehicle (3). During work, the transverse movement of said lateral work units (5a, 5b) advantageously makes it possible to modify the overlapping between said work area (18) of said front work units (4a, 4b) and the respective work areas (20a, 20b) of said lateral work units (5a, 5b). Such a modification of the overlapping may be advantageous when said agricultural machine (1) is working at an inclination or when it is working along a curve. Preferably, the translational movement of each lateral work unit (5a, 5b) in accordance with said respective articulation (11a, 11b) may be controlled individually during the work. When passing into the transport position, the translational movement of said lateral work units (5a, 5b) toward said carrying vehicle (3) makes it possible in particular to facilitate pivoting of these units about said articulations (10a, 10b). In the light of FIG. 3, when said lateral work units (5a, 5b) are in the substantially vertical transport position, said translational movement in accordance with said respective articulations (11a, 11b) also makes it possible to reduce the height (24) of said agricultural machine (1).

In the first exemplary embodiment represented in FIGS. 1 to 5, each lateral work unit (5a, 5b) is thus connected in a sliding manner to a respective carrying arm (12a, 12b) by means of said respective articulation (11a, 11b). In turn, each carrying arm (12a, 12b) is connected in a pivoting manner to said carrying vehicle (3) by means of said respective articulation (10a, 10b).

Said carrying arms (12a, 12b) are preferably connected by means of said respective articulations (10a, 10b) to a hitching structure (13), which hitching structure (13) is connected for its part to a rear hitching device (14) of said carrying vehicle (3). Said rear hitching device (14), represented by way of nonlimiting example in the form of a "3-point" hitching device, advantageously makes it possible to move said hitching structure (13), and consequently said lateral work units (5a, 5b), in a substantially vertical direction. Thus, when passing from the horizontal work position to the substantially vertical transport position, said rear hitching device (14) makes it possible, if necessary to facilitate the maneuver by moving said lateral work units (5a, 5b) away from the ground.

Said work units (4a, 4b, 5a, 5b) advantageously comprise a respective suspension device (22). During work, each suspension device (22) makes it possible on the one hand to transfer at least part of the weight of the corresponding cutting device to said carrying vehicle (3). On the other hand, each suspension device (22) allows said cutting device a certain freedom of movement with respect to said carrying vehicle (3). Each cutting device may thus move individually in a substantially vertical direction and about a mid-axis of said work unit (4a, 4b, 5a, 5b) directed in said direction of forward travel (2). This freedom of movement advantageously makes it possible for said cutting devices to follow the unevenness of the ground independently of said carrying vehicle (3). When said work units (4a, 4b, 5a, 5b) are in the work position, each suspension device (22) additionally makes it possible to advantageously move each cutting device individually away from the ground in order, for example, to carry out maneuvers at the end of fields or to avoid an obstacle. Such suspension devices (22) are known to a person skilled in the art and will therefore not be described further.

Preferably, said driver's cab (6) comprises a control device connected in particular to the operating members for said articulations (7a, 7b, 10a, 10b, 11a, 11b). Said control device is intended to autonomously manage the movement of said work units (4a, 4b, 5a, 5b) upon passing from the work position to the transport position, and vice versa. The driver of said agricultural machine (1) thus advantageously sees his task simplified.

Preferably, each work unit (4, 5) also comprises a conditioning device intended to accelerate drying of the product cut by the corresponding cutting device. In a manner known to a person skilled in the art, each conditioning device consists, for example, of a rotor or of two counter-rotating rollers.

Particularly advantageously, each work unit (4a, 4b, 5a, 5b) additionally comprises a respective conveying device (25a, 25b, 26a, 26b) intended to move the product cut by the corresponding cutting device before said cut product touches the ground.

In a first work configuration as represented in FIG. 4, the product cut over said total work area (21) is grouped into two swaths (27a, 27b).

In a second work configuration as represented in FIG. 5, the product cut over said total work area (21) is grouped into a single swath (28).

Particularly advantageously, the driver of said agricultural machine (1) may pass from said first work configuration to said second work configuration, and vice versa, from his driver's cab (6).

To this end, in the first exemplary embodiment represented in FIGS. 1 to 5, said conveying devices (25a, 25b) with which said front work units (4a, 4b) are respectively equipped each comprise a conveyor belt (29a, 29b) arranged transversely behind said corresponding cutting devices. Each conveying device (25a, 25b) is advantageously connected in a sliding manner to said corresponding front work unit (4a, 4b). In the work position, said conveying devices (25a, 25b) can thus be translationally moved horizontally and transversely to said direction of forward travel (2) operating members are provided for this purpose. In a manner known to a person skilled in the art, each conveyor belt (29a, 29b) comprises a belt wound around two cylinders. At least one of said cylinders is driven in rotation by means of an engine. The direction of travel of said conveyor belts (29a, 29b) can advantageously be reversed. Said direction of travel of said conveyor belts (29a, 29b) has been represented by means of arrows in FIGS. 4 and 5.

Said conveying devices (26a, 26b) with which said lateral work units (5a, 5b) are respectively equipped each comprise two conveyor belts (30a, 31a; 30b, 31b) arranged one above the other. Said conveyor belts (30a, 31a, 30b, 31b) are arranged transversely behind the corresponding cutting device. In a manner known to a person skilled in the art, each conveyor belt (30a, 31a, 30b, 31b) comprises a belt wound around two respective cylinders. At least one of said cylinders of each conveyor belt (30a, 31a, 30b, 31b) is driven in rotation by means of an engine. Particularly advantageously, the lower conveyor belts (31a, 31b) are advantageously connected in a sliding manner to said corresponding lateral work unit (5a, 5b). In the work position, said lower conveyor belts (31a, 31b) can thus be translationally moved horizontally and transversely to said direction of forward travel (2) operating members are provided for this purpose. By contrast, said upper conveyor belts (30a, 30b) and their respective cylinders retain a fixed position with respect to said corresponding lateral work unit (5a, 5b). Said direction of travel of said conveyor belts (30a, 31a; 30b, 31b) has been represented by means of arrows in FIGS. 4 and 5.

In the first work configuration, said front conveying devices (25a, 25b) are brought close to the vertical mid-plane of said carrying vehicle (3). The direction of travel of said conveyor belts (29a, 29b) is as represented in FIG. 4. Said front conveying devices (25a, 25b) are dimensioned and moved translationally in such a manner that the product cut by each front work unit (4a, 4b) is deposited beside said carrying vehicle (3) without thereby going outside said respective work area (17a, 17b). Said front work units (4a, 4b) thus form a respective half-swath (32a, 32b) on either side of said carrying vehicle (3). In the light of FIG. 4, said lower conveyor belts (31a, 31b) of said lateral conveying devices (26a, 26b) remain positioned under said respective upper conveyor belts (30a, 30b). Thus, said lower conveyor belts (31a, 31b) are not in contact with the cut product. Preferably, said lower conveyor belts (31a, 31b) are not driven in this work configuration. By contrast, the direction of travel of said upper conveyor belts (30a, 30b) is as represented in FIG. 4. Said upper conveyor belts (30a, 30b) are dimensioned in such a way that the product cut by said corresponding lateral work unit (5a, 5b) is deposited immediately beside said existing half-swath (32a, 32b). The product cut by said front work unit (4a) and by said lateral work unit (5a) thus forms said swath (27a). Likewise, the product cut by said front work unit (4b) and by said lateral work unit (5b) thus forms said swath (27b).

In the second work configuration represented in FIG. 5, said front conveying devices (25a, 25b) are moved away from the vertical mid-plane of said carrying vehicle (3). The direction of travel of said conveyor belts (29a, 29b) is as represented in FIG. 5. The product cut by each front work unit (4a, 4b) is thus deposited in front of said carrying vehicle (3) in order to form a single half-swath (33). Preferably, said front conveying devices (25a, 25b) are moved translationally in such a way that said front wheels (15a) and the two rear wheels (15b) of said carrying vehicle (3) can pass on either side of said half-swath (33). In the light of FIG. 5, said lower conveyor belts (31a, 31b) of said lateral conveying devices (26a, 26b) are moved translationally toward the vertical mid-plane of said carrying vehicle (3). The direction of travel of said upper conveyor belts (30a, 30b) and of said lower conveyor belts (31a, 31b) is as represented in FIG. 5. The product cut by said lateral work unit (5a, 5b) is thus first moved by said upper conveyor belt (30a, 30b) and then by said lower conveyor belt (31a, 31b). Said lower conveyor belts (31a, 31b) are dimensioned in such a way that the product cut by said corresponding lateral work unit (5a, 5b) is deposited immediately beside said half-swath (33). The product cut by said front work units (4a, 4b) and by said lateral work units (5a, 5b) thus forms said single swath (28). Said swath (28) is advantageously arranged along a longitudinal mid-axis of said agricultural machine (1).

For reasons of clarity, said articulations (7a, 7b), said hitching structure (8) and said front hitching device (9) have not been represented in FIGS. 4 and 5. Likewise, said articulations (10a, 10b), said hitching structure (13) and said rear hitching device (14), said articulations (11a, 11b) and said arms (12a, 12b) have not been represented in FIG. 5.

FIGS. 6 to 8 represent a second exemplary embodiment of an agricultural machine (101) according to the present invention. This agricultural machine (101) comprises a certain number of elements which have been described above. These elements will consequently keep the same reference number and will not be described again. It also comprises a certain number of elements which are comparable to elements of the agricultural machine (1) described above. These elements will be assigned the same reference number as these comparable elements of the agricultural machine (1) but increased by 100. They will only be described if it proves necessary to do so.

Thus, said agricultural machine (101) likewise comprises two front work units (4a, 4b) and two lateral work units (5a, 5b) connected to a carrying vehicle (103). Viewed in the direction of forward travel (2) during work, said front work units (4a, 4b) are arranged at the front of said carrying vehicle (103). Said lateral work units (5a, 5b) are arranged backwards with regard to said front work units (4a, 4b). In the work position as represented in FIGS. 6 and 8, said lateral work units (5a, 5b) are additionally arranged on either side of the work area (18) of said front work units (4a, 4b).

By contrast, in the second exemplary embodiment represented in FIGS. 6 to 8, said lateral work units (5a, 5b) are arranged on the sides of said carrying vehicle (103). Furthermore, viewed in said direction of forward travel (2) during work, said carrying vehicle (103) comprises a driver's cab (106) advantageously arranged at the rear of said lateral work units (5a, 5b). During work, the driver of said agricultural machine (101) thus has said front work units (4a, 4b) and said lateral work units (5a, 5b) in his field of view simultaneously.

In the second exemplary embodiment, said work units (4a, 4b, 5a, 5b ) are likewise moved with respect to said carrying vehicle (103) so as to reach a transport position as represented in FIG.7.

Thus, each front work unit (4a) 4b) is connected in a pivoting manner to said carrying vehicle (103). This connection has been largely described in the first exemplary embodiment represented in FIGS.1 to 5.

In the second exemplary embodiment represented in FIGS. 6 to 8, each lateral work unit (5a, 5b) is connected in a pivoting manner to said carrying vehicle (103) by means of a respective articulation (110a, 110b) whose axis is directed in said direction of forward travel (2). Also provided are operating members intended to pivot said lateral work units (5a, 5b) from a horizontal work position to a substantially vertical transport position, and vice versa. In the transport position, said lateral work units (5a, 5b) are preferably likewise arranged symmetrically with respect to said vertical mid-plane of said carrying vehicle (103). In the light of FIG. 7, said respective articulations (110a, 110b) are positioned so that, in the transport position, said lateral work units (5a, 5b) do not exceed said permitted gage (23) for traveling on the public highway. In the transport position, said lateral work units (5a, 5b) are advantageously arranged between the front wheels (15a) and the rear wheels (15b) of said carrying vehicle (103).

Particularly advantageously, each lateral work unit (5a, 5b) is additionally connected in a sliding manner to said carrying vehicle (103) by means of a respective articulation (11a, 11b) whose axis is directed transversely to said direction of forward travel (2). Also provided are operating members intended to translationally move said lateral work units (5a, 5b) in accordance with said respective articulations (11a, 11b). Each lateral work unit (5a, 5b) may thus be brought close to or moved away from said carrying vehicle (103).

Consequently, in the second exemplary embodiment represented in FIGS. 6 to 8, each lateral work unit (5a, 5b) is connected by means of said respective articulation (11a, 11b) to a respective carrying arm (12a, 12b). In turn, each carrying arm (12a, 12b) is connected by means of said respective articulation (110a, 110b) to said carrying vehicle (103).

In the second exemplary embodiment, and particularly advantageously, said agricultural machine (101) moves, during transport, in a direction of forward travel (34) which is oppositely directed to said direction of forward travel (102). To achieve this, said driver's cab (106) is advantageously of the "reversed driving" type. Thus, in the light of FIG. 7, said work units (4a, 4b, 5a, 5b) arranged vertically do not obstruct the field of view of said driver during transport.

In the second exemplary embodiment, said agricultural machine (101) can work according to a first work configuration in which the product cut over said total work area (21) is grouped into two swaths. This first work configuration of said agricultural machine (101) has not been represented because it has been largely described in the first exemplary embodiment.

Said agricultural machine (101) can also work according to a second work configuration, as represented in FIG. 8, in which the product cut over said total work area (21) is grouped into a single swath (28).

In the second work configuration represented in FIG. 8, said front conveying devices (25a, 25b) are moved away from the vertical mid-plane of said carrying vehicle (103). The direction of travel of said conveyor belts (29a, 29b) is as represented in FIG. 8. The product cut by each front work unit (4a, 4b) is thus deposited in front of said carrying vehicle (103) so as to form a half-swath (33). Preferably, said front conveying devices (25a, 25b) are moved translationally in such a way that said front wheels (15a) and the two rear wheels (15b) of said carrying vehicle (103) can pass on either side of said half-swath (33). In the light of FIG. 8, said lower conveyor belts (31a, 31b) of said lateral conveying devices (26a, 26b) are moved translationally toward the vertical mid-plane of said carrying vehicle (103). The direction of travel of said upper conveyor belts (30a, 30b) and of said lower conveyor belts (31a, 31b) is as represented in FIG. 8. The product cut by said lateral work unit (5a, 5b) is thus first moved by said upper conveyor belt (30a, 30b) and then by said lower conveyor belt (31a, 31b). Said lower conveyor belts (31a, 31b) are dimensioned in such a way that the product cut by said corresponding lateral work unit (5a, 5b) is deposited immediately beside said half-swath (33). The product cut by said front work units (4a, 4b) and by said lateral work units (5a, 5b) thus forms said single swath (28). Said swath (28) is advantageously arranged along a longitudinal mid-axis of said agricultural machine (101).

In the second exemplary embodiment represented in FIG. 8, the product cut by said lateral work units (5a, 5b) is deposited at the front of said rear wheels (15b). Said single swath (28) thus achieves its final width between said front wheels (15a) and said rear wheels (15b). Particularly advantageously, said rear wheels (15b) are connected in a sliding manner to said carrying vehicle (103) by means of a respective articulation (15c) defining a substantially horizontal axis transverse to said direction of forward travel (2). Also provided are operating members intended to translationally move said rear wheels (15b) in accordance with said respective articulation (15c). Thus, said rear wheels (15b) may, if necessary, be moved away from said carrying vehicle (103) in order not to roll over said single swath (28). During transport on the other hand, said rear wheels (15b) come back to their initial positions as represented in FIGS. 6 and 7 so as not to exceed said permitted gage (23) for traveling on the public highway.

For reasons of clarity, various elements for connecting said work units (4a, 4b, 5a, 5b) to said carrying vehicle (103) have not been represented in FIG. 8.

The agricultural machines which have just been described are merely exemplary embodiments which do not in any case limit the scope of protection defined by the following claims.

Thus, in a third exemplary embodiment represented partially and on a different scale in FIG. 9, said lateral work units (5a, 5b) are connected in a pivoting manner to a respective arm (212a, 212b) by means of an articulation (210a, 210b) whose axis is directed in said direction of forward travel (2). In turn, each arm (212a, 212b) is connected in a sliding manner to said carrying vehicle (3) by means of an articulation (211a, 211b) whose axis is directed transversely to said direction of forward travel (2).

According to another not represented example, said agricultural machine comprises three front work units arranged, during work, at the front of said carrying vehicle. At least one of said front work units is connected in a pivoting manner to said carrying vehicle by means of an articulation whose axis is directed in said direction of forward travel. Furthermore, at least one of said front work units is connected in a sliding manner to said carrying vehicle by means of an articulation whose axis is directed transversely to said direction of forward travel.

According to yet another not represented exemplary embodiment, said respective arm is advantageously telescopic. Thus, in a manner known per se, the length of said respective arm may be increased or reduced.

FIGS. 10 to 13 represent a fourth exemplary embodiment of an agricultural machine (301) according to the present invention. This fourth exemplary embodiment is distinguished from the preceding exemplary embodiments described mainly at the level of the conveying devices (326a, 326b) with which said lateral work units (5a, 5b) are equipped. Specifically, each conveying device (326a, 326b) comprises an upper conveyor belt (330a, 330b) and a lower conveyor belt (331a, 331b). By contrast, said lower conveyor belts (331a, 331b) are from now on connected in a pivoting manner to said corresponding lateral work unit (5a, 5b) by means of a respective articulation (37a, 37b) of upwardly directed axis. In the work position, said lower conveyor belts (331a, 331b) may thus be pivoted in a substantially horizontal plane operating members are provided for this purpose. Said upper conveyor belts (330a, 330b) of the fourth exemplary embodiment are similar to said upper conveyor belts (30a, 30b) of the first exemplary embodiment and will therefore not be described further.

In the first work configuration represented in FIGS. 10 and 12, said agricultural machine (301) groups the cut product into two swaths (27a, 27b). To this end, said lower conveyor belts (331a, 331b) remain positioned under said corresponding upper conveyor belts (330a, 330b). Thus, said lower conveyor belts (331a, 331b) are not in contact with the cut product. Preferably, said lower conveyor belts (331a, 331b) are not driven in this work configuration. By contrast, the direction of travel of said upper conveyor belts (330a, 330b) is as represented in FIG. 10. The product cut by said lateral work unit (5a, 5b) is therefore deposited immediately beside said existing half-swath (32a, 32b) so as to create a respective swath (27a, 27b). This position of said lower conveyor belts (331a, 331b) is also used when said lateral work units (5a, 5b) are placed in the transport position.

In the second work configuration represented in FIGS. 11 and 13, said agricultural machine (301) groups the cut product into a single swath (28). To this end, said lower conveyor belts (331a, 331b) are pivoted about said respective articulation (37a, 37b) toward a vertical mid-plane of said carrying vehicle (303). The position of said articulations (37a, 37b) is such that said lower conveyor belts (331a, 331b) can, after pivoting, take away the cut product from said corresponding upper conveyor belts (330a, 330b). Said lower conveyor belts (331a, 331b) and said upper conveyor belts (330a, 330b) are driven in the direction of travel represented in FIG. 11. The product cut by said work unit (5a, 5b) is thus first moved by said upper conveyor belt (330a, 330b) and then by said lower conveyor belt (331a, 331b). Said lower conveyor belts (331a, 331b) are dimensioned in such a way that said product cut by said corresponding lateral work unit (5a, 5b) is deposited immediately beside said half-swath (33) formed by said front work units (4a, 4b). The product cut by said front work units (4a, 4b) and by said lateral work units (5a, 5b) thus forms said single swath (28).

In the light of FIG. 11, said lower conveyor belts (331a, 331b) advantageously make it possible to deposit said cut product behind said rear wheels (15b) of said carrying vehicle (303), even when said lateral work units (5a, 5b) are arranged in the work position beside said carrying vehicle (303).

For reasons of clarity, only said lateral work units (5a, 5b) and said swaths (27a, 27b; 28) have been represented in FIGS. 12 and 13.

Advantageously, each lower conveyor belt (331a, 331b) is composed in turn of a first conveyor belt (35a, 35b) and of a second conveyor belt (36a, 36b). Said first conveyor belt (35a, 35b) and said second conveyor belt (36a, 36b) are arranged in the continuation of one another. Furthermore, said second conveyor belt (36a, 36b) is connected in a pivoting manner to said corresponding first conveyor belt (35a, 35b) by means of a respective articulation (38a, 38b) of at least substantially horizontal axis.

In the first work configuration and in the light of FIGS. 10 and 12, said first conveyor belt (35a, 35b) is substantially horizontal and said second conveyor belt (36a, 36b) is substantially vertical. Such a position makes it possible in particular to reduce the space taken up by said conveying device (326a, 326b). Said first conveyor belt (35a, 35b) is arranged at least partially below said corresponding upper conveyor belt (330a, 330b) in such a way as not to come into contact with said cut product. The cut product is therefore conveyed solely by said upper conveyor belts (330a, 330b).

In the second work configuration and in the light of FIGS. 10 and 12, said first conveyor belt (35a, 35b) remains substantially horizontal. By contrast, said second conveyor belt (36a, 36b) is from now on pivoted about said articulation (38a, 38b) so as to be likewise substantially horizontal. Furthermore, the direction of travel of said first and second conveyor belts (35a, 35b, 36a, 36b) is as represented in FIG. 11. The cut product is therefore conveyed by said upper conveyor belts (330a, 330b) and then by said first conveyor belts (35a, 35b) and finally by said second conveyor belts (36a, 36b).

In the light of FIG. 12 in particular the axis of said respective articulation (38a, 38b) is coincident with the axis of rotation of one of said cylinders of said corresponding second conveyor belt (36a, 36b).

The invention claimed is:

1. An agricultural machine including a carrying vehicle and plural work units configured to cut a standing product, the work units being connected to the carrying vehicle, the agricultural machine comprising:
   at least two front work units, each front work unit including a cutting device including a plurality of cutting members, which cutting members are each driven in rotation about a respective upwardly directed axis, the front work units being arranged, during work and viewed in a direction of forward travel of the carrying vehicle, at a front of the carrying vehicle such that the two front work units are located in front of an axis of rotation of a front wheel of the carrying vehicle; and
   at least two lateral work units, each lateral work unit including a cutting device including a plurality of cutting members, which cutting members are each driven in rotation about a respective upwardly directed axis, the lateral work units being arranged, during work, on either side of the carrying vehicle and outside of a work area of the front work units,
   wherein the front work units and the lateral work units are configured to be moved with respect to the carrying vehicle so as to occupy a transport position or a work position,
   wherein each work unit comprises a respective cutting device configured to cut a standing product, and wherein at least one of the work units comprises a respective conveying device configured to move the product cut by the corresponding cutting device before the cut product touches the ground,
   wherein at least one of the front work units comprises a respective conveying device, and
   wherein the conveying device comprises a conveyor belt arranged transversely behind the corresponding cutting device.

2. An agricultural machine as claimed in claim 1, further comprising an engine configured to drive the conveyor belt in two directions of travel.

3. An agricultural machine as claimed in claim 1, wherein the conveying device is connected in a sliding manner to the corresponding front work unit, and wherein operating members are provided configured to translationally move the conveying device horizontally, viewed in the work position, and transversely to the direction of forward travel.

4. An agricultural machine as claimed in claim 1, wherein the lateral work units are offset in a direction opposite to the direction of forward travel from the front of the carrying vehicle during work such that the lateral work units are at least partially behind the axis of the front wheel.

5. An agricultural machine as claimed in claim 4, wherein the lateral work units are disposed outside of a projection of the front work units, the projection being in a direction about perpendicular to the direction of forward travel.

6. An agricultural machine as claimed in claim 1, wherein the at least two front work units include a first front work unit and a second front work unit,
   the first front work unit includes a first housing within which a plurality of cutting members of the first front work unit are disposed, and
   the second front work unit includes a second housing, separate from the first housing, and within which a plurality of cutting members of the second front work unit are disposed.

7. An agricultural machine including a carrying vehicle and plural work units configured to cut a standing product, the work units being connected to the carrying vehicle, the agricultural machine comprising:
   at least two front work units, each front work unit including a cutting device including a plurality of cutting members, which cutting members are each driven in rotation about a respective upwardly directed axis, the front work units being arranged, during work and viewed in a direction of forward travel of the carrying vehicle, at a front of the carrying vehicle such that the two front work units are located in front of an axis of rotation of a front wheel of the carrying vehicle; and
   at least two lateral work units, each lateral work unit including a cutting device including a plurality of cutting members, which cutting members are each driven in rotation about a respective upwardly directed axis, the lateral work units being arranged, during work, on either side of a work area of the front work units,
   wherein the front work units and the lateral work units are configured to be moved with respect to the carrying vehicle so as to occupy a transport position or a work position,
   wherein each work unit comprises a respective cutting device configured to cut a standing product, and wherein at least one of the work units comprises a respective conveying device configured to move the product cut by the corresponding cutting device before the cut product touches the ground, and
   wherein the conveying device comprises an upper conveyor belt and a lower conveyor belt, the conveyor belts being arranged, at least in one position, one above the other and transversely behind the corresponding cutting device.

8. An agricultural machine as claimed in claim 7, wherein the lower conveyor belt is connected in a sliding manner to the corresponding lateral work unit, and wherein operating members are provided configured to translationally move the lower conveyor belt horizontally, viewed in the work position, and transversely to the direction of forward travel.

9. An agricultural machine as claimed in claim 7, wherein the lower conveyor belt is connected in a pivoting manner to the corresponding lateral work unit by an articulation whose axis is directed upward.

10. An agricultural machine as claimed in claim 9, wherein the lower conveyor belt comprises a first conveyor belt and a second conveyor belt.

11. An agricultural machine as claimed in claim 10, wherein the second conveyor belt is connected in a pivoting manner to the corresponding first conveyor belt by a respective articulation of substantially horizontal axis.

12. An agricultural machine as claimed in claim 7,
wherein the at least two front work units include a first front work unit and a second front work unit,
the first front work unit includes a first housing within which a plurality of cutting members of the first front work unit are disposed, and
the second front work unit includes second housing, separate from the first housing, and within which a plurality of cutting members of the second front work unit are disposed.

* * * * *